Figure 1:
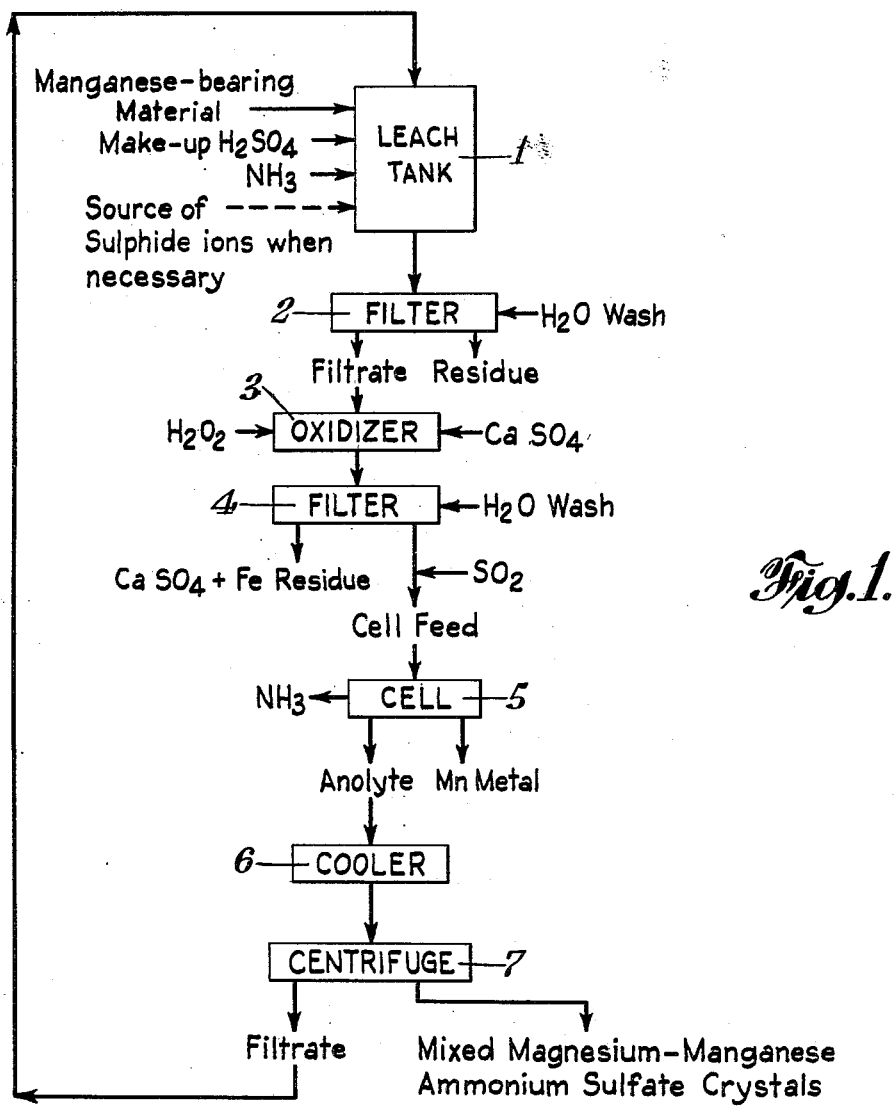

United States Patent Office 2,820,749
Patented Jan. 21, 1958

2,820,749

METHOD OF REMOVING CALCIUM FROM SOLUTIONS

Michael C. Carosella, Niagara Falls, N. Y., assignor to Union Carbide Corporation, a corporation of New York Application May 23, 1955, Serial No. 510,150

3 Claims. (Cl. 204—105)

The present invention relates to a method of removing calcium from solutions and, more particularly, to a method of removing calcium from sulphate solutions employed in the electrowinning of manganese.

In the electrowinning of manganese, when manganese-bearing materials which contain soluble lime are employed as the source of cell feed, certain inherent problems are presented which seriously affect the operation of the electrowinning cycle. Although the presence of calcium in the cell feed is not harmful to electrodeposition, calcium sulphate precipitates on the cell feed storage tanks, anodes, cell walls, anolyte storage tanks, line pumps, valves and, where it is especially detrimental to the cyclic operation, on the anolyte side of the diaphragms. The amount of calcium so deposited on surfaces of the apparatus of the system is restored to the solution when more manganese-bearing material is leached, thereby providing additional calcium sulphate for harmful deposition which causes a clogging of the diaphragm pores and a marked variation in the solution level between anolyte and catholyte. Eventually, the diaphragms are clogged and stiffened to a point where further use is impossible and the diaphragms must be discarded and new diaphragms substituted.

Heretofore, it has been attempted to precipitate calcium from the cell feed solutions as an insoluble fluoride, but it has been found that no fluoride precipitation resulted until a hydrofluoric acid concentration approximately ten times the theoretical amount was obtained. Even then, the resultant precipitate was so slimy that filtration was extremely difficult. It has also been found that the presence of fluorides in appreciable quantities in the cell have an undesirable effect on the electrowinning operation.

It is, therefore, the prime object of the present invention to provide a method for reducing the concentration of calcium in sulphate solutions prior to the use of such solutions as cell feed in the electrowinning of manganese.

Other aims and advantages of the invention will be apparent from the following description and appended claims.

In accordance with the present invention, manganese sulphate solutions for use as cell feed in the electrowinning of manganese, containing calcium concentrations greater than 0.8 gram per liter, are treated with calcium sulphate seeding crystals, the pH of the resultant slurry is adjusted to below 7.5 and the slurry agitated to precipitate calcium sulphate on the seeding crystals.

In my copending application Serial No. 371,285, entitled "Production of Manganese" and filed July 30, 1953, now Patent No. 2,766,197, a cyclic process for the electrowinning of manganese is described wherein manganese-bearing slags are employed as the source of cell feed solution. Such slags are obtained from manganese ore by the furnacing operation wherein ferromanganese and the manganese slag are produced. During such furnacing operation a considerable quantity of calcium impurities contained in the ore passes to the slag and is thus present in the cell feed solution formed upon leaching the slag.

It has been found that the removal of calcium from sulphate solutions to concentrations below 0.8 grams per liter is probably not possible by ordinary methods and calcium will not precipitate below that concentration regardless of the initial concentrations. It has also been found that manganese sulphate cell feed solutions obtained from the leaching of most manganese-bearing materials, particularly ferromanganese slags, contain calcium in concentrations of from about 1.5 to 0.83 grams per liter.

Figure 2:
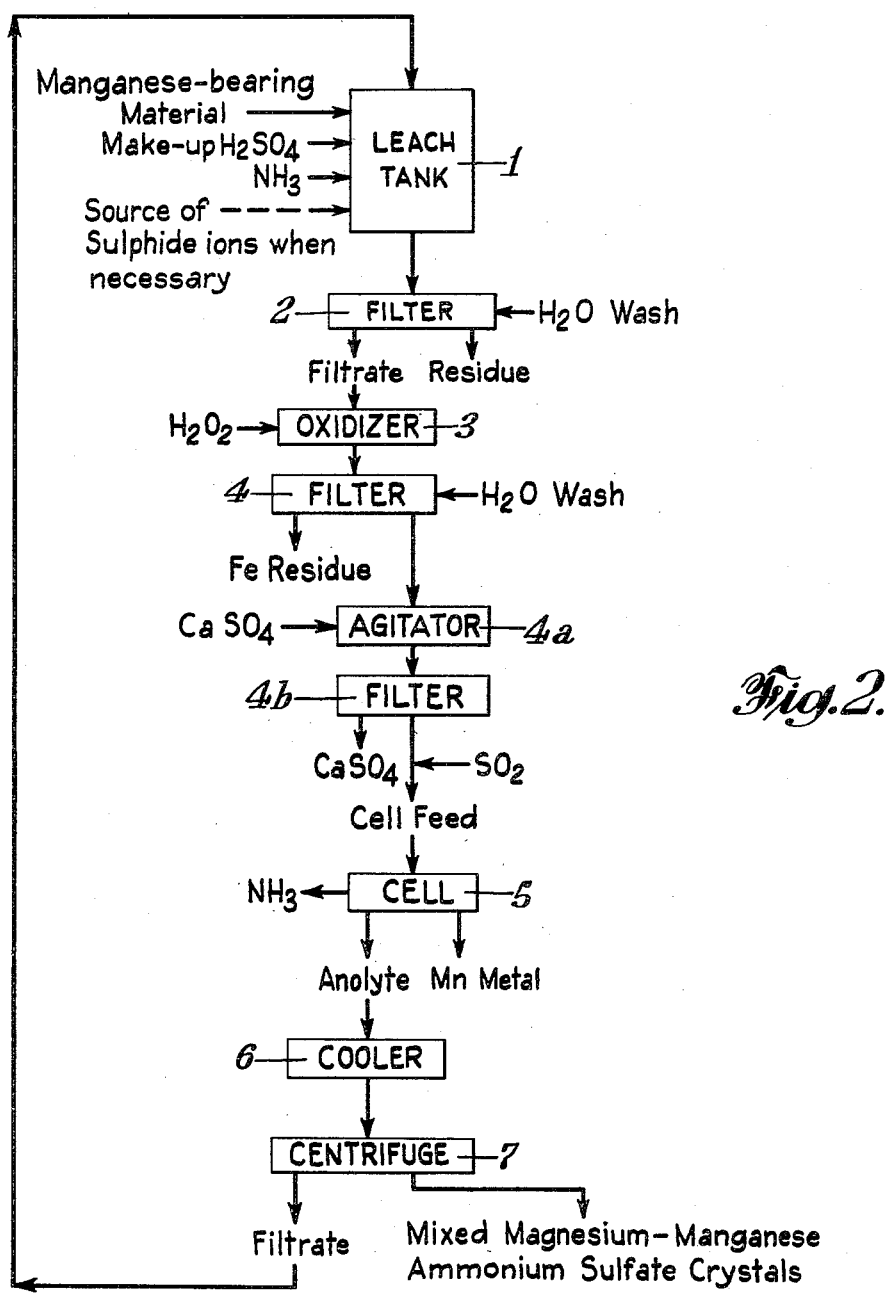

In the drawings:

Fig. 1 is a flow sheet of a cyclic process for the electrowinning of manganese employing the calcium purification step of the invention concurrently with iron removal; and Fig. 2 is a flow sheet of an alternative cyclic process for the electrowinning of manganese in which the calcium purification step of the invention is practiced separately subsequent to the iron removal step.

Referring specifically to Fig. 1 of the drawing, a manganese-bearing material, such as manganese slag, reduced ore, or the like, is leached with sulphuric acid, the major portion of which is obtained from anolyte formed at and recycled from the later electrowinning step and the remainder from make-up sulphuric acid. The anolyte may be purified to remove magnesium before recycling. This leaching step is indicated as box 1 in the flow sheet. To the leached slurry so formed, a source of sulphide ions such as ammonium sulphide may be added when, as in an unusual case, it is necessary to make up for a deficiency of sulphide ions in the manganese-bearing material. When ferromanganese slags are employed as the manganese-bearing material this addition will ordinarily not be required.

The pH of the leach slurry is adjusted to approximately 4.0 to 7.5 by the addition of ammonia. The resulting pulp is filtered to remove the residue which contains silica, alumina, and objectionable metal impurities. This step is indicated as box 2 of the flow sheet.

The resulting filtrate is concurrently treated with hydrogen peroxide, or equivalent oxidizing agent, and calcium sulphate crystals, such as gypsum ($CaSO_4 \cdot 2H_2O$) or the like, and the pH of the solution is adjusted to between approximately 4.5 and 7.5 to precipitate the remaining iron impurities as ferric hydroxide and calcium impurities as calcium sulphate on the seeding crystals. This step is shown as box 3 of the flow sheet. The mixed iron and calcium precipitate so obtained is removed from the solution, as is illustrated by box 4 of the flow sheet.

Sulphur dioxide is added to the filtrate to form cell feed which is introduced into the catholyte compartment of a diaphragm electrolytic cell, shown as box 5 of the flow sheet.

Electrolysis of sulphate solution in the cell results in the formation of high purity manganese at the cathode, and sulphuric acid and some manganese dioxide at the anode. When magnesium impurities are present in the manganese-bearing material, the anolyte obtained from the electrowinning step is cooled to a temperature at which mixed magnesium-manganese-ammonium sulphate crystals are formed. The cooler is shown as step 6 in the flow sheet. These crystals are removed from the solution which is then recycled to the leaching step. The crystal removal step is illustrated by box 7 of the flow sheet.

In an example of the purification method of the invention, sixty-two pounds of plus 150-mesh commercial gypsum was added to a 700-gallon batch of ferromanganese slag leach filtrate. The iron was oxidized with hydrogen peroxide and precipitated as ferric hydroxide, and the batch then agitated for four hours. A 30-minute settling period was then allowed, after which the slurry was decanted through a filter press, leaving a four-inch heel in the tank. Most of the calcium sulphate settled to the bottom, but almost all of the ferric hydroxide remained in suspension. The pH was at all times maintained between 5.5 and 7.5. Two more batches were made in the same manner using the heel left from the previous batch. From 0.06 to 0.09 g./l. of calcium was removed from the solutions by this treatment, indicating that the presence of iron does not interfere with the calcium precipitation.

It has been found that the purification method of the invention may be alternatively practiced as a separate step as well as in combination with the iron removal step. Such alternative procedure is shown in Fig. 2 of the drawing. As there shown, the filtrate obtained from filtering step 4 is passed to an agitator where seeding with calcium sulphate crystals and a pH adjustment to below approximately 7.5 are accomplished. This step is indicated as box 4a of the flow sheet. The seeded slurry upon agitation causes the calcium impurities to precipitate as sulphates which crystallize on the seeding crystals. Filtering is then performed to remove the calcium sulphate crystals from the filtrate. This step is shown as box 4b of the flow sheet.

In an example of the present invention wherein calcium impurities are removed in a separate step, 50 liters of manganese ammonium sulphate cell feed, containing calcium in a concentration of 1.03 grams per liter, was treated in the manner described above with 4 pounds of gypsum and the resultant slurry was adjusted to a pH of 3.0 and agitated for 24 hours. The calcium concentration was lowered in this manner to 0.83 gram per liter.

In another example, 700 gallon batches of solution were each seeded with about 75 pounds of wet calcium sulphate whereupon the pH was adjusted to below 7.5 and the slurry was agitated. Each slurry was filtered on a filter press and the residue returned to the tank for seeding subsequent batches. The filtrates contained from 0.9 to 0.98 gram per liter of calcium before treatment, and from 0.80 to 0.86 gram per liter after treatment. It was found that temperature had little or no effect on the amount of calcium precipitated nor did treatment time above 4 hours decrease the calcium concentration of the solution.

In a still further example a 700 gallon batch of manganese and ammonium sulphate solution was treated with 5 pounds of very fine terra alba, a commercial gypsum. The solution was agitated for four hours and filtered. The calcium content was reduced from 0.85 to 0.83 gram per liter. Although this reduction in calcium concentration at first sight may seem minor, the results are in accord with the above-stated effect that calcium does not precipitate below about 0.80 gram per liter. If the calcium concentration had been higher than 0.85 gram per liter, more calcium would quite probably have been removed.

It has been found that prior to the employment of the purification method of the invention, a dense, acicular gypsum deposit formed on the diaphragm walls of the cell after approximately eight weeks' use. When the solution was treated in accordance with the purification method of the invention, approximately 50% of the calcium normally precipitated in the cell and anolyte circuit was removed from the cell feed prior to the introduction of cell feed into the cell. Thus, the removal of about 0.1% of calcium was equivalent to a 50% reduction in the calcium sulphate deposited on the diaphragm over a similar period of use.

What is claimed is:

1. In a process for the treatment of manganese and ammonium sulphate solutions for the electrowinning of metallic manganese to remove calcium contained in minor quantities, the improvement which comprises concurrently seeding said solutions with calcium sulphate crystals and adjusting the pH of the resulting slurry to a value between approximately 4.5 and 7.5, and agitating said slurry to obtain crystallization of calcium sulphate precipitate on said seeding crystals, and separating the resulting filtrate from said crystals.

2. In a cyclic process for the electrowinning of manganese wherein a manganese-bearing material is leached with sulphuric acid to form electrolytic cell feed solution which is electrolyzed in a cell to form metallic manganese at the cathode and a sulphuric acid-containing anolyte which is recycled to leach further manganese-bearing material, the steps for the removal of minor quantities of calcium in the range of 0.83 to 1.5 grams per liter which comprise concurrently seeding said solutions with calcium sulphate crystals and adjusting the pH of the resulting slurry to a value between approximately 4.5 and 7.5, agitating said slurry to obtain crystallization of calcium sulphate precipitate on said seeding crystals, and separating the resulting filtrate from said crystals.

3. In a cyclic process for the electrowinning of manganese wherein a manganese-bearing material is leached with sulphuric acid to form electrolytic cell feed solution which is electrolyzed in a cell to form metallic manganese at the cathode and a sulphuric acid-containing anolyte which is recycled to leach further manganese-bearing material, the steps for the removal of iron and minor quantities of calcium which comprise concurrently treating said solution with an oxidizing agent capable of precipitating the contained iron values as ferric hydroxide, seeding said solutions with calcium sulphate crystals, and adjusting the pH of the resulting slurry to a value between approximately 4.5 and 7.5, and subsequently agitating said slurry to obtain crystallization of calcium sulphate precipitate on said seeding crystals, and separating the resulting filtrate from the residue.

References Cited in the file of this patent

FOREIGN PATENTS

| | | |
|---|---|---|
| 515,293 | Great Britain | Nov. 30, 1939 |
| 577,970 | Great Britain | June 11, 1946 |
| 605,448 | Great Britain | July 23, 1948 |